United States Patent
Yuan et al.

(10) Patent No.: US 10,400,088 B2
(45) Date of Patent: Sep. 3, 2019

(54) EFFICIENT HALOGEN-FREE FLAME RETARDANT MASTERBATCH FOR POLYPROPYLENE AND PREPARATION METHOD AND USE THEREOF

(71) Applicant: GUANGZHOU SUPER-DRAGON ENGINEERING PLASTICS CO., LTD, Guangdong (CN)

(72) Inventors: Haibing Yuan, Guangdong (CN); Jianxin Hao, Guangdong (CN); Zebin Huang, Guangdong (CN); Lei Wu, Guangdong (CN); Jue'an Deng, Guangdong (CN); Zhimou Hou, Guangdong (CN); Muliang Fan, Guangdong (CN); Yuanzeng Hao, Guangdong (CN); Ping Ren, Guangdong (CN)

(73) Assignee: GUANGZHOU SUPER-DRAGON ENGINEERING PLASTICS CO., LTD, Guangdong (CN)

( * ) Notice: Subject to any disclaimer, the term of this patent is extended or adjusted under 35 U.S.C. 154(b) by 190 days.

(21) Appl. No.: 15/518,766

(22) PCT Filed: Nov. 28, 2015

(86) PCT No.: PCT/CN2015/095879
§ 371 (c)(1),
(2) Date: Apr. 13, 2017

(87) PCT Pub. No.: WO2017/075855
PCT Pub. Date: May 11, 2017

(65) Prior Publication Data
US 2018/0016418 A1 Jan. 18, 2018

(30) Foreign Application Priority Data
Nov. 5, 2015 (CN) .............................. 201510744176

(51) Int. Cl.
| | |
|---|---|
| *C08K 5/523* | (2006.01) |
| *C08J 3/22* | (2006.01) |
| *C08K 3/32* | (2006.01) |
| *C08K 5/00* | (2006.01) |
| *C08K 5/521* | (2006.01) |
| *C08K 13/02* | (2006.01) |
| *C08L 23/12* | (2006.01) |
| *C08K 5/3492* | (2006.01) |

(52) U.S. Cl.
CPC .............. *C08K 5/523* (2013.01); *C08J 3/22* (2013.01); *C08J 3/226* (2013.01); *C08K 3/32* (2013.01); *C08K 5/0066* (2013.01); *C08K 5/34922* (2013.01); *C08K 5/521* (2013.01); *C08K 13/02* (2013.01); *C08J 2323/12* (2013.01); *C08J 2423/12* (2013.01); *C08K 5/3492* (2013.01); *C08K 2003/323* (2013.01); *C08L 23/12* (2013.01); *C08L 2201/02* (2013.01); *C08L 2310/00* (2013.01)

(58) Field of Classification Search
CPC ........ C08K 5/523; C08K 3/32; C08K 5/0066; C08K 5/34922; C08K 5/521; C08K 13/02; C08K 5/3492; C08K 2003/323; C08J 3/22; C08J 3/226; C08J 2323/12; C08J 2423/12; C08L 23/12; C08L 2201/02; C08L 2310/00
USPC .......................................................... 524/127
See application file for complete search history.

(56) References Cited

FOREIGN PATENT DOCUMENTS

CN 102675737 A * 9/2012

OTHER PUBLICATIONS

CN 102675737A—machine translation (Year: 2012).*

* cited by examiner

*Primary Examiner* — Ronald Grinsted
(74) *Attorney, Agent, or Firm* — JCIPRNET

(57) ABSTRACT

The present invention provides an efficient halogen-free flame retardant masterbatch for polypropylene, which comprises following raw materials in percentage by weight: 30~40% of ammonium polyphosphate; 10~20% of pentaerythritol phosphate; 15~25% of melamine; 5~15% of bisphenol A bis(diphenyl phosphate); 10~30% of microporous polypropylene; 0.1~1% of pentaerythritol stearate; 0.1~0.5% of antioxidant 1010; and 0.1~0.5% of antioxidant 168. Said microporous polypropylene is particles with a size of 3~5 mm, cell size on a surface of the particle is 10~100 μm, and cell density is more than $10^5$ cells/cm$^3$. The efficient halogen-free flame retardant masterbatch for polypropylene prepared by the invention has several characteristics of easy dispersing, easy processing, high flame retardant efficiency and low production cost, and it can be widely used in the production of flame retardant polypropylene materials for extrusion, injection molding and membrane blowing.

14 Claims, No Drawings

EFFICIENT HALOGEN-FREE FLAME RETARDANT MASTERBATCH FOR POLYPROPYLENE AND PREPARATION METHOD AND USE THEREOF

CROSS-REFERENCE TO RELATED APPLICATION

This application is a 371 application of an International PCT application serial no. PCT/CN2015/095879, filed on Nov. 28, 2015, which claims the priority benefits of China Application No. 201510744176.2, filed on Nov. 5, 2015. The entirety of each of the above-mentioned patent application is hereby incorporated herein and made a part of this specification.

TECHNICAL FIELD

The present invention relates to a field of preparation of flame retardant masterbatch material, and more specifically, relates to an efficient halogen-free flame retardant masterbatch for polypropylene, a preparation method and use thereof.

BACKGROUND

Flame retardant masterbatch, known as fire retardant masterbatch and fireproof masterbatch, is also known as "concentrate" abroad which means a concentrate of the flame retardant. The flame retardant masterbatch has been generated for a few decades, which firstly is mainly to solve the problem of uneven dispersion and severe dust pollution in the process of using flame retardant powder. After several years of development, by considerable applications of scientific means and new technologies, people investigating flame retardant masterbatch are not restricted to general problems such as dispersion and prevention of pollution. It has been formed as an independent discipline and developed into an independent industry. By plenty of technical research and application, the flame retardant masterbatch has become a high-tech product or a product of high-technology.

The existing flame retardant technology provides polyolefin with flame retardancy by means of direct addition of flame retardant. Nowadays, the common halogen-free flame retardant mainly includes inorganic flame retardant and phosphorus-nitrogen type intumescent flame retardant. However, due to the poor consistency with polyolefin resin and the low flame retardant efficiency, inorganic flame retardant presents a certain flame retardant effect only when a large amount of filling. This will seriously damage the mechanical property and processing property of polyolefin. In order to overcome the deficiency of inorganic type flame retardant in low flame retardant efficiency, a phosphorus-nitrogen type halogen-free flame retardant with high flame retardant efficiency is utilized generally in polyolefin resin. When heated, such flame retardant can form a layer of compact carbon foam layer on the surface, which can isolate heat as well as oxygen, inhibit smoke and prevent molten drop, and also provides good flame retardancy. In addition, such flame retardant is halogen-free and low-toxic when it is burnt, and no corrosive gas produces. It belongs to an environmental friendly type flame retardant, and therefore, has developed very fast.

Since these phosphorus-nitrogen type flame retardants are generally formed as powder with fineness thereof generally being 400 meshes or more, a large amount of dust pollution can be easily generated during weighing, mixing and pelletizing. This would worsen the production environment, do great harm to human health, and make wear on processing equipment at a certain extent. Moreover, phosphorus-nitrogen type flame retardants have problems of relatively strong hygroscopicity, low thermal stability and poor consistency with polyolefin resin, which result in that the flame retardant materials are sensitive to moisture, easy to be foamed and easy to be degraded, result in the weakness such as poor dispersibility of flame retardant in the resin and a certain extent of damage to processing properties and mechanical properties of the materials.

SUMMARY OF THE INVENTION

According to the deficiency of existing flame retardant masterbatch material, the present invention provides an efficient halogen-free flame retardant masterbatch for polypropylene.

Another object of the present invention is to provide a preparation method and use of the above-mentioned efficient halogen-free flame retardant masterbatch for polypropylene.

The present invention enables a prepared halogen-free flame retardant masterbatch to have advantages such as dust-free, easy to disperse, high flame retardant efficiency, low cost and strong processing adaptability by means of selecting and utilizing an environmental friendly, efficient and halogen-free flame retardant and a continuous production process of high speed stirring, crushing and extruding, and therefore dust pollution may be reduced and the production environment may be improved.

The technical objects of the present invention can be realized by following technical solutions:

The present invention provides an efficient halogen-free flame retardant masterbatch for polypropylene, said masterbatch comprising following raw materials in percentage by weight:

ammonium polyphosphate 30~40%
pentaerythritol phosphate 10~20%
melamine 15~25%
bisphenol A bis(diphenyl phosphate) 5~15%
microporous polypropylene 10~30%
pentaerythritol stearate 0.1~1%
antioxidant 1010 0.1~0.5%
antioxidant 168 0.1~0.5%;

said microporous polypropylene is particles with a size of 3~5 mm, cell size on a surface of the particle is 10~100 μm, and cell density is more than $10^5$ cells/cm$^3$.

In particular, microporous polypropylene serves as an adsorbent for a liquid flame retardant (bisphenol A bis (diphenyl phosphate)) and as a carrier for such flame retardant masterbatch. A main function of the microporous polypropylene is to adsorb bisphenol A bis(diphenyl phosphate) into micropores and to combine phosphorus-nitrogen type halogen-free flame retardant powders together, in order to achieve a granular halogen-free flame retardant masterbatch. Ammonium polyphosphate, pentaerythritol phosphate and melamine respectively serve as acid resource, carbon resource and gas resource, constituting an intumescent type flame retardant system, and they cooperate with each other to achieve the object of efficient flame retardancy. As an efficient phosphorus flame retardant, bisphenol A bis(diphenyl phosphate) can provide phosphorus-nitrogen synergistic flame retardant effect with melamine. As a lubricant with low melting point, pentaerythritol stearate, on one hand, can reduce wear between material and equipment; on the other hand, pentaerythritol stearate can enhance a dispersion effect of halogen-free flame retardant on the carrier.

Function of antioxidant 1010 and antioxidant 168 is to improve the thermal processing stability and the ability of anti-thermo-oxidative aging of the material.

Preferably, said masterbatch comprises following raw materials in percentage by weight:
ammonium polyphosphate 32~38%
pentaerythritol phosphate 13~17%
melamine 18~22%
bisphenol A bis(diphenyl phosphate) 8~10%
microporous polypropylene 15~25%
pentaerythritol stearate 0.5~1%
antioxidant 1010 0.2~0.5%
antioxidant 168 0.2~0.5%.

Preferably, said microporous polypropylene is prepared by following preparation method:
stirring a mixture of high melt-strength co-polypropylene, foaming agent, antioxidant 1010, antioxidant 168 and calcium stearate; melt-blending and extruding the mixture; after pelletizing and drying, said microporous polypropylene can be obtained.

More preferably, said microporous polypropylene comprises following raw materials in percentage by weight:
high melt-strength co-polypropylene 80~90%
foaming agent 5~12%
antioxidant 1010 0.1~0.5%
antioxidant 168 0.1~0.5%
calcium stearate 0.5~1%.

Preferably, said ammonium polyphosphate has a mean particle size of 8~10 μm.

More preferably, said ammonium polyphosphate is HT-208 purchased from Jinan Taixing Fine Chemicals Co. Ltd or APP high molecular ammonium polyphosphate (n>1000) from Shandong Shian Chemical Co., Ltd.

Preferably, said pentaerythritol phosphate has a purity of more than 99%, a moisture content of less than 0.2%, and a mean particle size of 5~8 μm.

More preferably, said pentaerythritol phosphate is pentaerythritol phosphate (PEPA) purchased from Jiangsu Victory Chemical Co., Ltd.

Preferably, said melamine has a purity of more than 99%.

More preferably, said melamine is high-class product melamine purchased from Chengdu Yulong Chemical Co., Ltd or Tianfu brand melamine (with a purity of more than 99.8%) from Sichuan Chemical Company Limited.

Preferably, said bisphenol A bis(diphenyl phosphate) has a viscosity of 1800~2600 mPa·s at 40° C. and a color of less than 80.

More preferably, said bisphenol A bis(diphenyl phosphate) is WSFR-BDP purchased from Zhejiang Wansheng Co., Ltd.

The present invention also provides a preparation method of said efficient halogen-free flame retardant masterbatch for polypropylene, including following steps:
S1. preparation of microporous polypropylene: stirring a mixture of high melt-strength co-polypropylene, foaming agent, antioxidant 1010, antioxidant 168 and calcium stearate; melt-blending and extruding the mixture; after pelletizing and drying, said microporous polypropylene can be obtained;
S2. mixing the microporous polypropylene obtained from S1 and bisphenol A bis(diphenyl phosphate) evenly, then let it stand for later use;
S3. melt-blending pentaerythritol stearate, antioxidant 1010, antioxidant 168 and the mixture obtained from S2, then adding ammonium polyphosphate, pentaerythritol phosphate and melamine for blending, after internal mixing, extruding and pelletizing, said efficient halogen-free flame retardant masterbatch for polypropylene can be obtained.

Preferably, the microporous polypropylene prepared from said S1 is particles with a size of 3~5 mm, cell size on a surface of the particle is 10~100 μm, and cell density is more than $10^5$ cells/cm$^3$.

Preferably, an extruder has an aspect ratio of 20~40; barrel temperature of the extruder is 150~180° C.; and rotating speed of a main engine of the extruder is 300~700 r/min.

The efficient halogen-free flame retardant masterbatch for polypropylene prepared by the invention has several characteristics of easy dispersing, easy processing, high flame retardant efficiency and low production cost, and it can be widely used in the production of flame retardant polypropylene materials for extrusion, injection molding and membrane blowing.

Compared with the prior art, the present invention has following beneficial effects:

The notable effect of the present invention is that using self-prepared microporous polypropylene to serve as both an adsorbent and a carrier of masterbatch, by adsorbing all liquid flame retardant (bisphenol A bis(diphenyl phosphate)) into the micropores, problems caused by the direct addition of liquid flame retardant are thus avoided, such as difficulty in processing, uneven dispersion and easy wearing.

In the present invention, a synergistic flame retardant effect is generated by an efficient phosphorus-nitrogen halogen-free intumescent flame retardant system which is formed by optimized ammonium polyphosphate, pentaerythritol phosphate and melamine, and thereby the addition amount of flame retardant can be reduced and the influence of flame retardant on the physical and mechanical properties of materials can be reduced.

In the present invention, adopting liquid efficient flame retardant (bisphenol A bis(diphenyl phosphate)) to be compounded with solid intumescent flame retardant system, on one hand, can generate synergistic flame retardant effect and reduce the addition amount of flame retardant, and on the other hand, can effectively avoid the difficulty of carrier covering caused by additional flame retardant powder, thereby improving the processing efficiency.

Since the efficient halogen-free flame retardant masterbatch for polypropylene prepared by the invention is granular, and is basically in accordance with a particle size of a basic resin, the materials can therefore be blended evenly so that it can prevent a situation of unstable quality of materials caused by the uneven blending of powder and pellets.

DETAILED DESCRIPTION OF THE PREFERRED EMBODIMENT

The present invention will be specifically described below by way of embodiments. It is necessary to indicate that the embodiments are only used to further described the present invention and they could not be interpreted as limitation of the scope of protection of the invention. Those skilled in the art can make some unessential improvements and adjustments according to above contents of the present invention.

Unless otherwise specified, reagents, methods and equipments used in the present invention are conventional reagents, methods and equipments in the present technical field.

The microporous polypropylene described in the embodiments and the comparative examples below is prepared by following steps:

Matching materials in percentage by weight as below: 89% of high melt-strength co-polypropylene (PP-WFW4, Mitsubishi Chemical Corporation, Japan), 10% of foaming agent (MJ Addifoam 43™, Beijing Plaschem Trading Co., Ltd), 0.2% of antioxidant (SONOX 1010, Shandong Linyi Sunny Wealth Chemical Co., Ltd), 0.3% of antioxidant (SONOX 168, Shandong Linyi Sunny Wealth Chemical Co., Ltd) and 0.5% of lubricant (calcium stearate 3818, BELIKE Chemical Co., Ltd). After above-mentioned materials are weighed, they are mixed evenly and added into a main feed hopper of a single screw extruder with an aspect ratio of 40:1. Temperature of each section from the hopper to a die-head in the single screw extruder is respectively set as 180° C., 190° C., 200° C., 190° C., 190° C., 190° C., 200° C., 210° C. and 220° C. The screw speed of a main engine is 450 r/min and the frequency of a feed screw of the main feed hopper is 13 Hz. The materials are melt-blended and extruded. A strip from a die of the single screw extruder is under water ring pelletizing and drying, and microporous polypropylene is then obtained.

Embodiment 1:

Following materials were matched in percentage by weight as below:

32% of ammonium polyphosphate (HT-208, Jinan Taixing Fine Chemicals Co. Ltd), 17% of pentaerythritol phosphate (produced by Jiangsu Victory Chemical Co., Ltd), 22% of melamine (high-class product, produced by Chengdu Yulong Chemical Co., Ltd), 8% of bisphenol A bis(diphenyl phosphate) (WSFR-BDP, Zhejiang Wansheng Co., Ltd), 19.8% of microporous polypropylene (self-prepared, the preparation method is described above), 0.5% of pentaerythritol stearate (GLYCOLUBE® P(ETS), American Lonza Chemical Inc.), 0.5% of antioxidant 1010 (SONOX 1010, Shandong Linyi Sunny Wealth Chemical Co., Ltd) and 0.2% of antioxidant 168 (SONOX 168, Shandong Linyi Sunny Wealth Chemical Co., Ltd).

Each component in above-described formula was weighed accurately. Bisphenol A bis(diphenyl phosphate) was mixed with microporous polypropylene into uniformity and then let the mixture stand for 5 hours. Then such mixture, together with pentaerythritol stearate, antioxidant 1010 and antioxidant 168, were added into a pressurized inverse internal mixer. Temperature in an internal mixer chamber was controlled at 160° C., the rotor speed was 50 r/min and the time of internal mixing was 6 minutes. After the materials melted, ammonium polyphosphate, pentaerythritol phosphate and melamine powder were added into the internal mixer by twice with 4 minutes between each addition. All materials were internal mixed for another 8 minutes after they were all added into the internal mixer.

Above-described plastic block after being internal mixed was transported to a hopper of a single screw extruder by a conveyer belt, and was chopped into pieces by a cutter in the hopper. Temperature of each section of a barrel was controlled at 170° C. and the rotor speed of a main engine was 500 r/min. After melting, being mixed and being extruded by the single screw, and then being wind-cooled, grinded surface and pelletized, the efficient halogen-free flame retardant masterbatch for polypropylene was made.

Embodiment 2

Following materials were matched in percentage by weight as below:

35.7% of ammonium polyphosphate (HT-208, Jinan Taixing Fine Chemicals Co. Ltd), 15% of pentaerythritol phosphate (produced by Jiangsu Victory Chemical Co., Ltd), 20% of melamine (Sichuan Chemical Co., Ltd), 8% of bisphenol A bis(diphenyl phosphate) (WSFR-BDP, Zhejiang Wansheng Co., Ltd), 20% of microporous polypropylene (self-prepared, the preparation method is described above), 0.6% of pentaerythritol stearate (GLYCOLUBE® P(ETS), American Lonza Chemical Inc.), 0.4% of antioxidant 1010 (SONOX 1010, Shandong Linyi Sunny Wealth Chemical Co., Ltd) and 0.3% of antioxidant 168 (SONOX 168, Shandong Linyi Sunny Wealth Chemical Co., Ltd).

Each component in above-described formula was weighed accurately. Bisphenol A bis(diphenyl phosphate) was mixed with microporous polypropylene into uniformity and then let the mixture stand for 5 hours. Then such mixture, together with pentaerythritol stearate, antioxidant 1010 and antioxidant 168, were added into the pressurized inverse internal mixer. The temperature in the internal mixer chamber was controlled at 160° C., the rotor speed was 50 r/min and the time of internal mixing was 6 minutes. After the materials melted, ammonium polyphosphate, pentaerythritol phosphate and melamine powder were added into the internal mixer by twice with 4 minutes between each addition. All materials were internal mixed for another 8 minutes after they were all added into the internal mixer.

Above-described plastic block after being internal mixed was transported to the hopper of the single screw extruder by the conveyer belt, and was chopped into pieces by the cutter in the hopper. Temperature of each section of the barrel was controlled at 170° C. and the rotor speed of the main engine was 500 r/min. After melting, being mixed and being extruded by the single screw, and then being wind-cooled, grinded surface and pelletized, the efficient halogen-free flame retardant masterbatch for polypropylene was made.

Embodiment 3

Following materials were matched in percentage by weight as below:

38% of ammonium polyphosphate (HT-208, Jinan Taixing Fine Chemicals Co. Ltd), 16.5% of pentaerythritol phosphate (produced by Jiangsu Victory Chemical Co., Ltd), 20% of melamine (high-class product, produced by Chengdu Yulong Chemical Co., Ltd), 9% of bisphenol A bis(diphenyl phosphate) (WSFR-BDP, Zhejiang Wansheng Co., Ltd), 15% of microporous polypropylene (self-prepared, the preparation method is described above), 0.8% of pentaerythritol stearate (GLYCOLUBE® P(ETS), American Lonza Chemical Inc.), 0.3% of antioxidant 1010 (SONOX 1010, Shandong Linyi Sunny Wealth Chemical Co., Ltd) and 0.4% of antioxidant 168 (SONOX 168, Shandong Linyi Sunny Wealth Chemical Co., Ltd).

Each component in above-described formula was weighed accurately. Bisphenol A bis(diphenyl phosphate) was mixed with microporous polypropylene into uniformity and then let the mixture stand for 6 hours. Then such mixture, together with pentaerythritol stearate, antioxidant 1010 and antioxidant 168, were added into the pressurized inverse internal mixer. The temperature in the internal mixer chamber was controlled at 160° C., the rotor speed was 50 r/min and the time of internal mixing was 6 minutes. After the materials melted, ammonium polyphosphate, pentaerythritol phosphate and melamine powder were added into the internal mixer by twice with 4 minutes between each addition. All materials were internal mixed for another 8 minutes after they were all added into the internal mixer.

Above-described plastic block after being internal mixed was transported to the hopper of the single screw extruder by the conveyer belt, and was chopped into pieces by the cutter in the hopper. Temperature of each section of the barrel was controlled at 170° C. and the rotor speed of the main engine was 500 r/min. After melting, being mixed and being extruded by the single screw, and then being wind-cooled, grinded surface and pelletized, the efficient halogen-free flame retardant masterbatch for polypropylene was made.

Embodiment 4

Following materials were matched in percentage by weight as below:

32.3% of ammonium polyphosphate (APP high molecular ammonium polyphosphate, Shandong Shian Chemical Co., Ltd), 13% of pentaerythritol phosphate (produced by Jiangsu Victory Chemical Co., Ltd), 18% of melamine (Sichuan Chemical Co., Ltd), 10% of bisphenol A bis (diphenyl phosphate) (WSFR-BDP, Zhejiang Wansheng Co., Ltd), 25% of microporous polypropylene (self-prepared, the preparation method is described above), 1% of pentaerythritol stearate (GLYCOLUBE® P(ETS), American Lonza Chemical Inc.), 0.2% of antioxidant 1010 (SONOX 1010, Shandong Linyi Sunny Wealth Chemical Co., Ltd) and 0.5% of antioxidant 168 (SONOX 168, Shandong Linyi Sunny Wealth Chemical Co., Ltd).

Each component in above-described formula was weighed accurately. Bisphenol A bis(diphenyl phosphate) was mixed with microporous polypropylene into uniformity and then let the mixture stand for 7 hours. Then such mixture, together with pentaerythritol stearate, antioxidant 1010 and antioxidant 168, were added into the pressurized inverse internal mixer. The temperature in the internal mixer chamber was controlled at 160° C., the rotor speed was 50 r/min and the time of internal mixing was 6 minutes. After the materials melted, ammonium polyphosphate, pentaerythritol phosphate and melamine powder were added into the internal mixer by twice with 4 minutes between each addition. All materials were internal mixed for another 8 minutes after they were all added into the internal mixer.

Above-described plastic block after being internal mixed was transported to the hopper of the single screw extruder by the conveyer belt, and was chopped into pieces by the cutter in the hopper. Temperature of each section of the barrel was controlled at 170° C. and the rotor speed of the main engine was 500 r/min. After melting, being mixed and being extruded by the single screw, and then being wind-cooled, grinded surface and pelletized, the efficient halogen-free flame retardant masterbatch for polypropylene was made.

COMPARATIVE EXAMPLE 1

Following materials were matched in percentage by weight as below:

45% of ammonium polyphosphate (HT-208, Jinan Taixing Fine Chemicals Co. Ltd), 25% of pentaerythritol phosphate (produced by Jiangsu Victory Chemical Co., Ltd), 4.5% of melamine (high-class product, produced by Chengdu Yulong Chemical Co., Ltd), 9% of bisphenol A bis(diphenyl phosphate) (WSFR-BDP, Zhejiang Wansheng Co., Ltd), 15% of microporous polypropylene (self-prepared, the preparation method is described above), 0.8% of pentaerythritol stearate (GLYCOLUBE® P(ETS), American Lonza Chemical Inc.), 0.3% of antioxidant 1010 (SONOX 1010, Shandong Linyi Sunny Wealth Chemical Co., Ltd) and 0.4% of antioxidant 168 (SONOX 168, Shandong Linyi Sunny Wealth Chemical Co., Ltd).

Each component in above-described formula was weighed accurately. Bisphenol A bis(diphenyl phosphate) was mixed with microporous polypropylene into uniformity and then let the mixture stand for 6 hours. Then such mixture, together with pentaerythritol stearate, antioxidant 1010 and antioxidant 168, were added into the pressurized inverse internal mixer. The temperature in the internal mixer chamber was controlled at 160° C., the rotor speed was 50 r/min and the time of internal mixing was 6 minutes. After the materials melted, ammonium polyphosphate, pentaerythritol phosphate and melamine powder were added into the internal mixer by twice with 4 minutes between each addition. All materials were internal mixed for another 8 minutes after they were all added into the internal mixer.

Above-described plastic block after being internal mixed was transported to the hopper of the single screw extruder by the conveyer belt, and was chopped into pieces by the cutter in the hopper. Temperature of each section of the barrel was controlled at 170° C. and the rotor speed of the main engine was 500 r/min. After melting, being mixed and being extruded by the single screw, and then being wind-cooled, grinded surface and pelletized, the efficient halogen-free flame retardant masterbatch for polypropylene was made.

COMPARATIVE EXAMPLE 2

Following materials were matched in percentage by weight as below:

32.3% of ammonium polyphosphate (APP high molecular ammonium polyphosphate, Shandong Shian Chemical Co., Ltd), 13% of pentaerythritol phosphate (produced by Jiangsu Victory Chemical Co., Ltd), 18% of melamine (Sichuan Chemical Co., Ltd), 10% of bisphenol A bis (diphenyl phosphate) (WSFR-BDP, Zhejiang Wansheng Co., Ltd), 25% of polypropylene copolymer (EP548R, CNOOC and Shell Petrochemicals Co., Ltd), 1% of pentaerythritol stearate (GLYCOLUBE® P(ETS), American Lonza Chemical Inc.), 0.2% of antioxidant 1010 (SONOX 1010, Shandong Linyi Sunny Wealth Chemical Co., Ltd) and 0.5% of antioxidant 168 (SONOX 168, Shandong Linyi Sunny Wealth Chemical Co., Ltd).

Each component in above-described formula was weighed accurately. Bisphenol A bis(diphenyl phosphate) was mixed with microporous polypropylene into uniformity and then let the mixture stand for 7 hours. Then such mixture, together with pentaerythritol stearate, antioxidant 1010 and antioxidant 168, were added into the pressurized inverse internal mixer. The temperature in the internal mixer chamber was controlled at 160° C., the rotor speed was 50 r/min and the time of internal mixing was 6 minutes. After the materials melted, ammonium polyphosphate, pentaerythritol phosphate and melamine powder were added into the internal mixer by twice with 4 minutes between each addition. All materials were internal mixed for another 8 minutes after they were all added into the internal mixer.

Above-described plastic block after being internal mixed was transported to the hopper of the single screw extruder by the conveyer belt, and was chopped into pieces by the cutter in the hopper. Temperature of each section of the barrel was controlled at 170° C. and the rotor speed of the main engine was 500 r/min. After melting, being mixed and being extruded by the single screw, and then being wind-cooled, grinded surface and pelletized, the efficient halogen-free flame retardant masterbatch for polypropylene was made.

COMPARATIVE EXAMPLE 3

Following materials were matched in percentage by weight as below:

38% of ammonium polyphosphate (HT-208, Jinan Taixing Fine Chemicals Co. Ltd), 16.5% of pentaerythritol phosphate (produced by Jiangsu Victory Chemical Co., Ltd), 20% of melamine (high-class product, produced by Chengdu Yulong Chemical Co., Ltd), 24% of microporous polypropylene (self-prepared, the preparation method is described above), 0.8% of pentaerythritol stearate (GLY-COLUBE® P(ETS), American Lonza Chemical Inc.), 0.3% of antioxidant 1010 (SONOX 1010, Shandong Linyi Sunny Wealth Chemical Co., Ltd) and 0.4% of antioxidant 168 (SONOX 168, Shandong Linyi Sunny Wealth Chemical Co., Ltd).

Each component in above-described formula was weighed accurately. Microporous polypropylene, pentaerythritol stearate, antioxidant 1010 and antioxidant 168 were added into the pressurized inverse internal mixer. The temperature in the internal mixer chamber was controlled at 160° C., the rotor speed was 50 r/min and the time of internal mixing was 6 minutes. After the materials melted, ammonium polyphosphate, pentaerythritol phosphate and melamine powder were added into the internal mixer by twice with 4 minutes between each addition. All materials were internal mixed for another 8 minutes after they were all added into the internal mixer.

Above-described plastic block after being internal mixed was transported to the hopper of the single screw extruder by conveyer belt, and was chopped into pieces by the cutter in the hopper. Temperature of each section of the barrel was controlled at 170° C. and the rotor speed of the main engine was 500 r/min. After melting, being mixed and being extruded by the single screw, and then being wind-cooled, grinded surface and pelletized, the efficient halogen-free flame retardant masterbatch for polypropylene was made.

COMPARATIVE EXAMPLE 4

Following materials were matched in percentage by weight as below:

38% of ammonium polyphosphate (HT-208, Jinan Taixing Fine Chemicals Co. Ltd), 16.5% of pentaerythritol phosphate (produced by Jiangsu Victory Chemical. Co., Ltd), 20% of melamine (high-class product, produced by Chengdu Yulong Chemical Co., Ltd), 9% of bisphenol A bis(diphenyl phosphate) (WSFR-BDP, Zhejiang Wansheng Co., Ltd), 15% of microporous polypropylene (self-prepared, the preparation method is described above), 0.8% of pentaerythritol stearate (GLYCOLUBE® P(ETS), American Lonza Chemical Inc.), 0.3% of antioxidant 1010 (SONOX 1010, Shandong Linyi Sunny Wealth Chemical Co., Ltd) and 0.4% of antioxidant 168 (SONOX 168, Shandong Linyi Sunny Wealth Chemical Co., Ltd).

Each component in above-described formula was weighed accurately. Bisphenol A bis(diphenyl phosphate), microporous polypropylene, pentaerythritol stearate, antioxidant 1010 and antioxidant 168 were added into the pressurized inverse internal mixer. The temperature in the internal mixer chamber was controlled at 160° C., the rotor speed was 50 r/min and the time of internal mixing was 6 minutes. After the materials melted, ammonium polyphosphate, pentaerythritol phosphate and melamine powder were added into the internal mixer by twice with 4 minutes between each addition. All materials were internal mixed for another 8 minutes after they were all added into the internal mixer.

Above-described plastic block after being internal mixed was transported to the hopper of the single screw extruder by conveyer belt, and was chopped into pieces by the cutter in the hopper. Temperature of each section of the barrel was controlled at 170° C. and the rotor speed of the main engine was 500 r/min. After melting, being mixed and being extruded by the single screw, and then being wind-cooled, grinded surface and pelletized, the efficient halogen-free flame retardant masterbatch for polypropylene was made.

COMPARATIVE EXAMPLE 5

The preparation method is as same as that in Embodiment 3. The difference is that the adopted microporous polypropylene (XP100, Shenzhen Kunstek Corporation) has an average cell diameter of 8 μm and a cell density of $10^4$ cells/cm$^3$.

COMPARATIVE EXAMPLE 6

The preparation method is as same as that in Embodiment 3. The difference is that the adopted acid resource is melamine pyrophosphate (MPP, produced by Shandong Shian Chemical Co., Ltd).

COMPARATIVE EXAMPLE 7

The preparation method is as same as that in Embodiment 3. The difference is that the adopted liquid flame retardant is resorcinol bis(diphenyl phosphate) (produced by Zhejiang Wansheng Co., Ltd).

The efficient halogen-free flame retardant masterbatch for polypropylene prepared by the present invention was mixed with polypropylene resin according to formulas from Table 1 in order to prepare flame retardant polypropylene. The masterbatches prepared by comparative examples 1~4 were mixed with the polypropylene resin according to the formulas from Table 2 in order to prepare flame retardant polypropylene. The test result of performance of above-mentioned flame retardant polypropylene is shown as Table 3.

The performances of efficient halogen-free flame retardant masterbatch for polypropylene prepared by the present invention were tested by following experiments:

TABLE 1

Formulas of Embodiments

| | Embodiment number | | | |
|---|---|---|---|---|
| | Embodiment 1 | Embodiment 2 | Embodiment 3 | Embodiment 4 |
| Content of polypropylene resin (PPZ30S) | 65% | 65% | 65% | 65% |
| Category and content of efficient halogen-free flame retardant masterbatch for polypropylene | Content of masterbatch obtained from Embodiment 1 is 32% | Content of masterbatch obtained from Embodiment 2 is 32% | Content of masterbatch obtained from Embodiment 3 is 32% | Content of masterbatch obtained from Embodiment 4 is 32% |
| Content of other processing agents | 3% | 3% | 3% | 3% |

TABLE 2

Formulas of Comparative Examples

| | Comparative example 1 | Comparative example 2 | Comparative example 3 | Comparative example 4 | Comparative example 5 | Comparative example 6 | Comparative example 7 |
|---|---|---|---|---|---|---|---|
| Content of polypropylene resin (PPZ30S) | 65% | 65% | 65% | 65% | 65% | 65% | 65% |
| Category and content of efficient halogen-free flame retardant masterbatch for polypropylene | Content of masterbatch obtained from Comparative example 1 is 32% | Content of masterbatch obtained from Comparative example 2 is 32% | Content of masterbatch obtained from Comparative example 3 is 32% | Content of masterbatch obtained from Comparative example 4 is 32% | Content of masterbatch obtained from Comparative example 5 is 32% | Content of masterbatch obtained from Comparative example 6 is 32% | Content of masterbatch obtained from Comparative example 7 is 32% |
| Content of other processing agents | 3% | 3% | 3% | 3% | 3% | 3% | 3% |

TABLE 3

Test result of performance of flame retardant PP material

| | Notch impact strength 23° C. | Tensile yield strength | Bending strength (23° C.) | Flexural modulus (23° C.) | Flame retardancy |
|---|---|---|---|---|---|
| Unit | KJ/m$^2$ | MPa | MPa | MPa | |
| Test standard | GB/T1843-1996 | GB/T1040-2006 | GB/T9341-2000 | GB/T9341-2000 | UL94 |
| Embodiment 1 | 3.9 | 25 | 34 | 1950 | 2.0 mmV0 |
| Embodiment 2 | 3.8 | 24 | 34 | 1945 | 2.0 mmV0 |
| Embodiment 3 | 4.2 | 23 | 36 | 1976 | 1.5 mmV0 |
| Embodiment 4 | 4.5 | 25 | 35 | 2010 | 3.2 mmV0 |
| Comparative example 1 | 3.2 | 21 | 38 | 2230 | 3.2 mmV0 |
| Comparative example 2 | 4.1 | 24 | 35 | 1988 | 3.2 mmHB |
| Comparative example 3 | 4.4 | 24 | 35 | 1936 | 3.2 mmV0 |
| Comparative example 4 | 3.8 | 21 | 34 | 1866 | 2.5 mmV0 |
| Comparative example 5 | 4.1 | 22 | 34 | 1926 | 2.5 mmV0 |
| Comparative example 6 | 4.0 | 22 | 36 | 1943 | 3.2 mmV0 |
| Comparative example 7 | 4.1 | 23 | 35 | 1902 | 3.2 mmV0 |

It can be seen from the above data that, comparing the masterbatch prepared by Embodiment 3 with that prepared by comparative example 1, after altering ratio of ammonium polyphosphate to pentaerythritol phosphate to melamine in the flame retardant, the flame retardancy of the material decreased from 1.5 mm V0 to 3.2 mm V0. It illustrates that the synergetic effect between the flame retardants decreased, resulting in that the flame retardancy decreased. Comparing the masterbatch prepared by Embodiment 4 with that prepared by comparative example 2, when using general polypropylene copolymer instead as a carrier in processing, the flame retardancy of the material decreased and the physical and mechanical properties decreased also.

Comparing comparative example 3 with Embodiment 3, the flame retardancy of flame retardant masterbatch prepared without addition of liquid flame retardant bisphenol A bis(diphenyl phosphate), decreased greatly from 1.5 mm V0 to 3.2 mm V0. It indicates that the liquid flame retardant bisphenol A bis(diphenyl phosphate) adopted in the present invention and the solid flame retardants which are ammonium polyphosphate, pentaerythritol phosphate and melamine adopted in the present invention, generate an inflaming retarding synergistic effect together.

Comparing comparative example 4 with Embodiment 3, the liquid flame retardant wasn't adsorbed by the microporous polypropylene. Instead, it was added by direct addition. The flame retardant effect of the masterbatch prepared by comparative example 4 reduced, and the physical and mechanical properties of the material decreased either. It indicates that only after the liquid flame retardant is adsorbed by the microporous polypropylene in advance and then is loaded with the solid flame retardant, can we achieve a better mixing effect.

Comparing comparative example 5 with Embodiment 3, when microporous polypropylene with smaller cell diameter and less cell density was used instead, due to the decline of its adsorption capacity for the liquid flame retardant, the flame retardant effect of flame retardant masterbatch prepared by comparative example 5 was worse.

Compared with comparative example 3, in comparative example 6 and comparative example 7, melamine pyrophosphate was used as an acid resource flame retardant instead and resorcinol bis(diphenyl phosphate) was used as the liquid flame retardant instead respectively. Because the types of flame retardant are different, the synergetic flame retardant effect between the flame retardants decreased and flame retardant efficiency of flame retardant masterbatch decreased greatly. It indicates from the corresponding data in Table 3 that, only after the solid flame retardants which are ammonium polyphosphate, pentaerythritol phosphate and melamine, and the liquid flame retardant which is bisphenol A bis(diphenyl phosphate) were adopted in the present invention and were adsorbed and loaded by the microporous polypropylene prepared in the present invention, can we achieve optimal flame retardancy under the precondition of not influencing the processability and the physical and mechanical properties of the material.

What is claimed:

1. An efficient halogen-free flame retardant masterbatch for polypropylene, comprising the following raw materials in percentage by weight based on a total weight of the masterbatch:

| ammonium polyphosphate | 30-40% |
| pentaerythritol phosphate | 10-20% |
| melamine | 15-25% |
| bisphenol A bis(diphenyl phosphate) | 5-15% |
| microporous polypropylene | 10-30% |
| pentaerythritol stearate | 0.1-1% |
| antioxidant 1010 | 0.1-0.5% |
| antioxidant 168 | 0.1-0.5%; | said microporous polypropylene is particles with a diameter of 3-5 mm, cell diameter on a surface of the particle is 10-100 μm, and cell density is more than $10^5$ cells/cm$^3$.

2. The efficient halogen-free flame retardant masterbatch for polypropylene according to claim 1, comprising the following raw materials in percentage by weight based on the total weight of the masterbatch:

| ammonium polyphosphate | 32-38% |
| pentaerythritol phosphate | 13-17% |
| melamine | 18-22% |
| bisphenol A bis(diphenyl phosphate) | 8-10% |
| microporous polypropylene | 15-25% |
| pentaerythritol stearate | 0.5-1% |
| antioxidant 1010 | 0.2-0.5% |
| antioxidant 168 | 0.2-0.5%. |

3. The efficient halogen-free flame retardant masterbatch for polypropylene according to claim 1, wherein said microporous polypropylene is prepared by the following preparation method:
   stirring a mixture of high melt-strength propylene-ethylene copolymer, foaming agent, antioxidant 1010, antioxidant 168 and calcium stearate; melt-blending and extruding the mixture; after pelletizing and drying, said microporous polypropylene can be obtained.

4. The efficient halogen-free flame retardant masterbatch for polypropylene according to claim 3, wherein said microporous polypropylene comprises the following raw materials in percentage by weight based on a total weight of the microporous polypropylene:

| high melt-strength propylene-ethylene copolymer | 80-90% |
| foaming agent | 5-12% |
| antioxidant 1010 | 0.1-0.5% |
| antioxidant 168 | 0.1-0.5% |
| calcium stearate | 0.5-1%. |

5. The efficient halogen-free flame retardant masterbatch for polypropylene according to claim 1, wherein said ammonium polyphosphate has a mean particle size of 8-10 μm.

6. The efficient halogen-free flame retardant masterbatch for polypropylene according to claim 1, wherein said pentaerythritol phosphate has a mean particle size of 5-8 μm.

7. The efficient halogen-free flame retardant masterbatch for polypropylene according to claim 1, wherein said bisphenol A bis(diphenyl phosphate) has a viscosity of 1800-2600 mPa·s at 40° C. and a color of less than 80 Hazen units.

8. A preparation method for the efficient halogen-free flame retardant masterbatch for polypropylene in claim 1, comprising:
   S1. preparation of microporous polypropylene: stirring a mixture of high melt-strength propylene-ethylene copolymer, foaming agent, antioxidant 1010, antioxidant 168 and calcium stearate; melt-blending and extruding the mixture; after pelletizing and drying, said microporous polypropylene can be obtained;
   S2. mixing the microporous polypropylene obtained from S1 and bisphenol A bis(diphenyl phosphate) evenly, then let it stand for later use;
   S3. melt-blending pentaerythritol stearate, antioxidant 1010, antioxidant 168 and the mixture obtained from S2, then adding ammonium polyphosphate, pentaerythritol phosphate and melamine for blending, after internal mixing, extruding and pelletizing, said efficient halogen-free flame retardant masterbatch for polypropylene can be obtained.

9. The preparation method according to claim 8, wherein said extruder has an aspect ratio of 20-40; barrel temperature of the extruder is 150-180° C.; and rotating speed of a main engine of the extruder is 300-700 r/min.

10. The efficient halogen-free flame retardant masterbatch for polypropylene according to claim 2, wherein said microporous polypropylene is prepared by the following preparation method:
    stirring a mixture of high melt-strength propylene-ethylene copolymer, foaming agent, antioxidant 1010, antioxidant 168 and calcium stearate; melt-blending and extruding the mixture; after pelletizing and drying, said microporous polypropylene can be obtained.

11. The efficient halogen-free flame retardant masterbatch for polypropylene according to claim 10, wherein said microporous polypropylene comprises the following raw materials in percentage by weight based on a total weight of the microporous polypropylene:

| | |
|---|---|
| high melt-strength propylene-ethylene copolymer | 80-90% |
| foaming agent | 5-12% |
| antioxidant 1010 | 0.1-0.5% |
| antioxidant 168 | 0.1-0.5% |
| calcium stearate | 0.5-1%. |

12. The efficient halogen-free flame retardant masterbatch for polypropylene according to claim 2, wherein said ammonium polyphosphate has a mean particle size of 8-10 μm.

13. The efficient halogen-free flame retardant masterbatch for polypropylene according to claim 2, wherein said pentaerythritol phosphate has a mean particle size of 5-8 μm.

14. The efficient halogen-free flame retardant masterbatch for polypropylene according to claim 2, wherein said bisphenol A bis(diphenyl phosphate) has a viscosity of 1800-2600 mPa·s at 40° C. and a color of less than 80 Hazen units.

* * * * *